(12) United States Patent
Wan et al.

(10) Patent No.: US 12,008,722 B2
(45) Date of Patent: Jun. 11, 2024

(54) MULTI-PLANE AUGMENTED REALITY IMAGE GENERATION

(71) Applicant: Ford Global Technologies, LLC, Dearborn, MI (US)

(72) Inventors: Jian Wan, Novi, MI (US); Anthony Gerald King, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 17/736,158

(22) Filed: May 4, 2022

(65) Prior Publication Data

US 2023/0360331 A1 Nov. 9, 2023

(51) Int. Cl.
| | |
|---|---|
| G06T 19/00 | (2011.01) |
| B60K 35/00 | (2006.01) |
| G02B 27/01 | (2006.01) |
| G06T 7/70 | (2017.01) |
| B60K 35/23 | (2024.01) |
| B60K 35/28 | (2024.01) |
| B60K 35/65 | (2024.01) |

(52) U.S. Cl.
CPC ............ *G06T 19/006* (2013.01); *B60K 35/00* (2013.01); *G02B 27/0101* (2013.01); *G06T 7/70* (2017.01); *B60K 35/23* (2024.01); *B60K 35/28* (2024.01); *B60K 35/65* (2024.01); *B60K 2360/166* (2024.01); *B60K 2360/167* (2024.01); *B60K 2360/177* (2024.01); *B60K 2360/21* (2024.01); *B60K 2360/25* (2024.01); *G02B 2027/0138* (2013.01); *G02B 2027/014* (2013.01); *G06T 2207/20081* (2013.01); *G06T 2207/20084* (2013.01); *G06T 2207/30252* (2013.01)

(58) Field of Classification Search
CPC .............. G06F 2111/18; G06F 3/0481; G06F 3/04817; G06F 9/4443; G06F 3/04847; G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS

| | | | |
|---|---|---|---|
| 2012/0224062 A1 | 9/2012 | Lacoste et al. | |
| 2021/0088786 A1 | 3/2021 | von Spiegel et al. | |
| 2021/0326690 A1 | 10/2021 | Pegard et al. | |
| 2021/0331589 A1 | 10/2021 | Christmas | |
| 2021/0373330 A1 | 12/2021 | Urey et al. | |
| 2023/0360331 A1* | 11/2023 | Wan ...................... | B60K 35/00 |

* cited by examiner

*Primary Examiner* — Todd Buttram
(74) *Attorney, Agent, or Firm* — Frank Lollo; Bejin Bieneman PLC (57) ABSTRACT

A set of training images are input into a neural network that outputs a pixel-wise phase matrix identifying pixels in the training images. Based on the pixel-wise phase matrix, a spatial light modulator (SLM) is actuated to output, onto a vehicle windshield, an augmented reality (AR) image including a plurality of sub-images each output in one of a plurality of focal planes. Each training image corresponds to one respective sub-image. A feedback image of the AR image is obtained via an image sensor. An offset is determined based on comparing the training images to the feedback image. Parameters of a loss function are updated based on the offset, and the updated parameters are provided to the neural network to obtain an updated offset.

20 Claims, 8 Drawing Sheets

MULTI-PLANE AUGMENTED REALITY IMAGE GENERATION

BACKGROUND

Vehicles typically include various displays to provide users with a variety of information. For example, vehicles can include instrument panels to provide a vehicle operator with data about a vehicle's speed, fuel status, engine temperature, etc. A vehicle can include a touchscreen display or the like to provide a variety of information and accept user input, e.g., for a climate control system, an audio system, etc. Yet further, a vehicle can include a heads-up display or the like to display information to be viewed by a vehicle operator or other user in combination with the user's view of a vehicle windshield and/or a roadway.

DETAILED DESCRIPTION

A vehicle can include a heads-up display (HUD) that can display content such as information about the vehicle and/or objects around the vehicle to an occupant of the vehicle. The HUD can project images onto a windshield of the vehicle. The HUD can provide content as an augmented reality (AR) image that includes a plurality of sub-images. The HUD can provide the AR image such that the sub-images, when viewed by the occupant, are overlayed with the objects around the vehicle. Thus, the HUD can display images in a manner to allow the occupant to view the images while also viewing a roadway along which the vehicle is traveling. However, projecting each sub-image into a single focal plane, e.g., on the windshield, may result in misalignment and low quality between one or more sub-images and the respective object to which the sub-image is being overlayed. Such misalignment and low quality may result in an undesirable aesthetic appearance and unclarity of the AR image for the occupant.

Advantageously, a neural network can be trained to accept a set of training images and to generate a pixel-wise phase matrix identifying pixels in the training images. Each training image corresponds to one respective sub-image of the AR image. A spatial light modulator (SLM) is actuated to output the AR image based on the pixel-wise phase matrix. That is, the SLM outputs each sub-image into one of a plurality of focal planes. For example, one sub-image can be output to appear on the windshield, and another sub-image can be output to appear to be exterior and forward of the windshield. An offset is determined between the training images and a feedback image including the AR image. The offset is used to update parameters of a loss function of the neural network. The updated parameters are used to train the neural network to output an updated pixel-wise phase matrix. Techniques disclosed herein improve displaying content via a HUD by providing the plurality of sub-images in respective focal planes, which can improve the alignment and quality of the sub-images with the corresponding objects around the vehicle thereby providing a desirable aesthetic appearance with high quality of the AR image to the occupant. Further, the techniques disclosed herein can train the neural network to optimize the pixel-wise phase matrix based on the windshield and the SLM.

The present disclosure includes system, comprising: a spatial light modulator (SLM) arranged to output, onto a vehicle windshield, an augmented reality (AR) image including a plurality of sub-images each output in one of a plurality of focal planes; an image sensor positioned to obtain a feedback image of the AR image; and a computer including a processor and a memory, the memory storing instructions executable by the processor programmed to: input a set of training images into a neural network that outputs a pixel-wise phase matrix identifying pixels in the training images, wherein each training image corresponds to one respective sub-image; actuate the SLM to output the AR image based on the pixel-wise phase matrix; determine an offset based on comparing the training images to the feedback image; and update parameters of a loss function based on the offset and provide the updated parameters to the neural network to obtain an updated offset.

The instructions can further include instructions to update parameters of the loss function until the updated offset is less than a predetermined threshold. The neural network can be trained to output a pixel-wise phase matrix calibrated to the vehicle windshield and the SLM when the updated offset is less than the predetermined threshold.

The image sensor can be spaced from the vehicle windshield to correspond to an expected pose of an occupant. The instructions can further include instructions to select the focal planes for the sub-images based on a user input. Each focal plane can be defined by a respective distance from an expected pose of an occupant. The instructions can further include instructions to, while training the neural network, actuate a projector to provide the training images to the SLM.

The instructions can further include instructions to, while training the neural network, select the training images from a plurality of training images. The system of claim 1, the instructions can further include instructions to: after training the neural network, generate a three-dimensional (3D) image based on vehicle operation data; and determine, via the trained neural network, a calibrated pixel-wise phase matrix for the 3D image. The instructions can further include instructions to, upon generating a set of masked images from the 3D image, input the masked images to the trained neural network that outputs the calibrated pixel-wise phase matrix for the 3D image. The system of claim 10, the instructions can further include instructions to generate the masked images by masking a plurality of pixels in the 3D image based on the focal planes, each masked pixel being a pixel of the 3D image having a depth corresponding to one of the focal planes. The system of claim 9, the instructions can further include instructions to actuate the SLM to output the AR image based on the calibrated pixel-wise phase matrix. The instructions can further include instructions to actuate a projector to provide the 3D image to the SLM.

Further according to this disclosure, a method can comprise: inputting a set of training images into a neural network that outputs a pixel-wise phase matrix identifying pixels in the training images; based on the pixel-wise phase matrix, actuating a spatial light modulator (SLM) to outputting, onto a vehicle windshield, an augmented reality (AR) image including a plurality of sub-images each output in one of a plurality of focal planes, wherein each training image corresponds to one respective sub-image; obtaining a feedback image of the AR image via an image sensor; determining an offset based on comparing the training images to the feedback image; and updating parameters of a loss function based on the offset and providing the updated parameters to the neural network to obtain an updated offset.

The method can further comprise updating parameters of the loss function until the updated offset is less than a predetermined threshold. The neural network can be trained to output a pixel-wise phase matrix calibrated to the vehicle windshield and the SLM when the updated offset is less than the predetermined threshold. The image sensor can be spaced from the vehicle windshield to correspond to an expected pose of an occupant. The focal planes for the sub-images can be selected based on a user input. Each focal plane can be selected based on a respective distance from an expected pose of an occupant. The can further comprise, while training the neural network, actuating a projector to provide the training image to the SLM.

With reference to FIGS. 1-6, an example control system 100 includes a vehicle 105, a remote computer 140, and an image sensor 145. The vehicle 105 includes a spatial light modulator (SLM) 150. A vehicle computer 110 in the vehicle 105 receives data from sensors 115. The SLM 150 is arranged to output, onto a vehicle windshield 310, an augmented reality (AR) image 300 including a plurality of sub-images 305 each output in one of a plurality of focal planes $P_1$, $P_2$, $P_3$. The image sensor 145 is positioned to obtain a feedback image of the AR image 300. The vehicle computer 110 is programmed to actuate the SLM 150 using a trained neural network 400, as discussed below.

Figure 4:
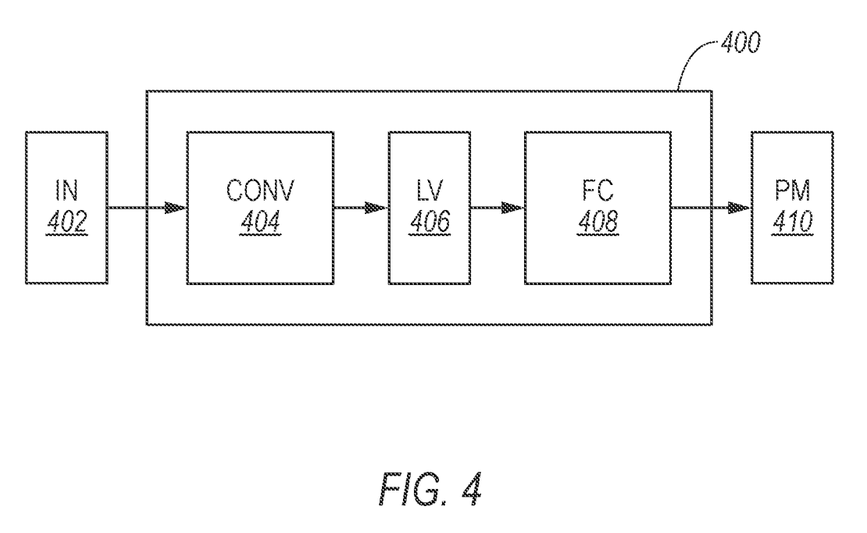
FIG. 4 is a diagram of an example neural network.

To train the neural network 400 to determine sub-images 305 for the focal planes $P_1$, $P_2$, $P_3$, the remote computer 140 is programmed to input a set of training images 402 into the neural network 400 that outputs a pixel-wise phase matrix 410 identifying pixels in the training images 402. Each training image 402 corresponds to one respective sub-image 305. The remote computer 140 is further programmed to actuate the SLM 150 to output the AR image 300 based on the pixel-wise phase matrix 410. The remote computer 140 is further programmed to determine a pixel-wise offset between the training images 402 and the feedback image 500. The remote computer 140 is further programmed to update parameters of a loss function based on the offset and provide the updated parameters to the neural network 400 to obtain an updated offset.

Figure 1:
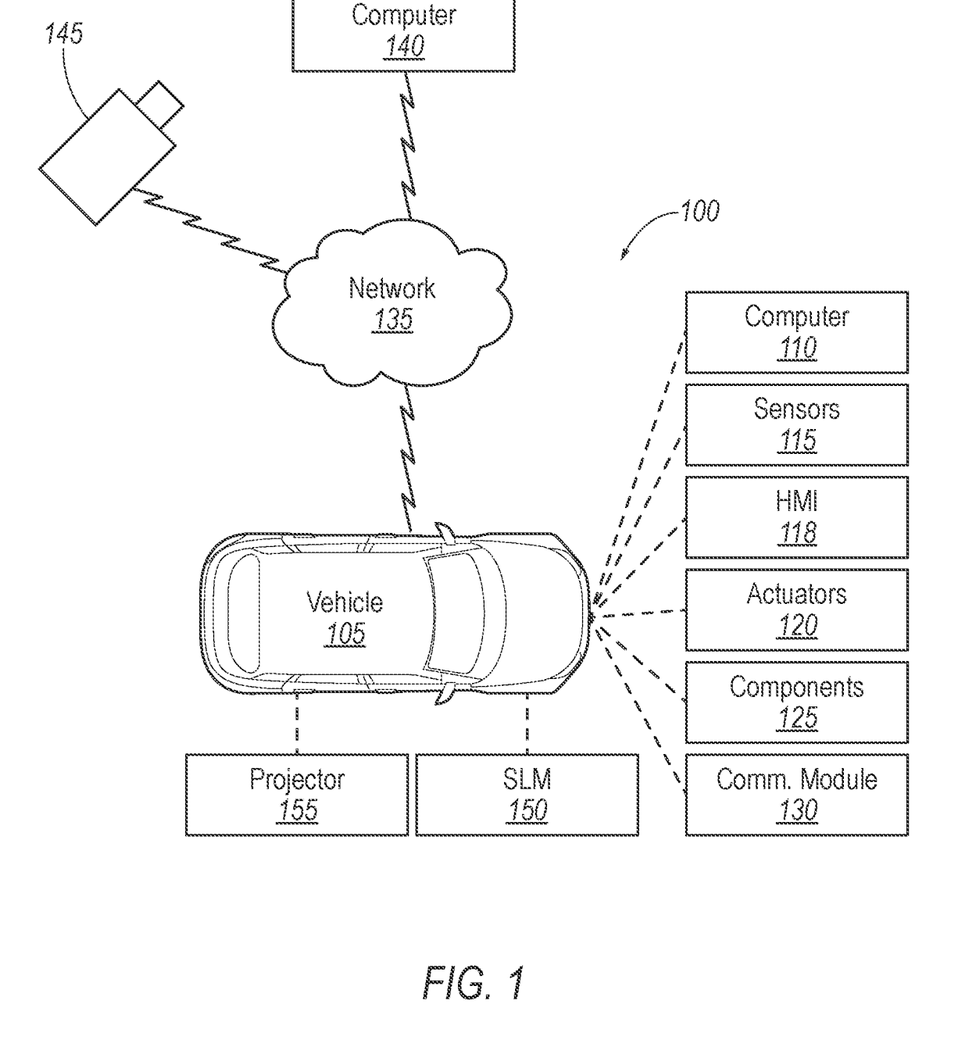
FIG. 1 is a block diagram illustrating an example control system for a vehicle.
Figure 2:
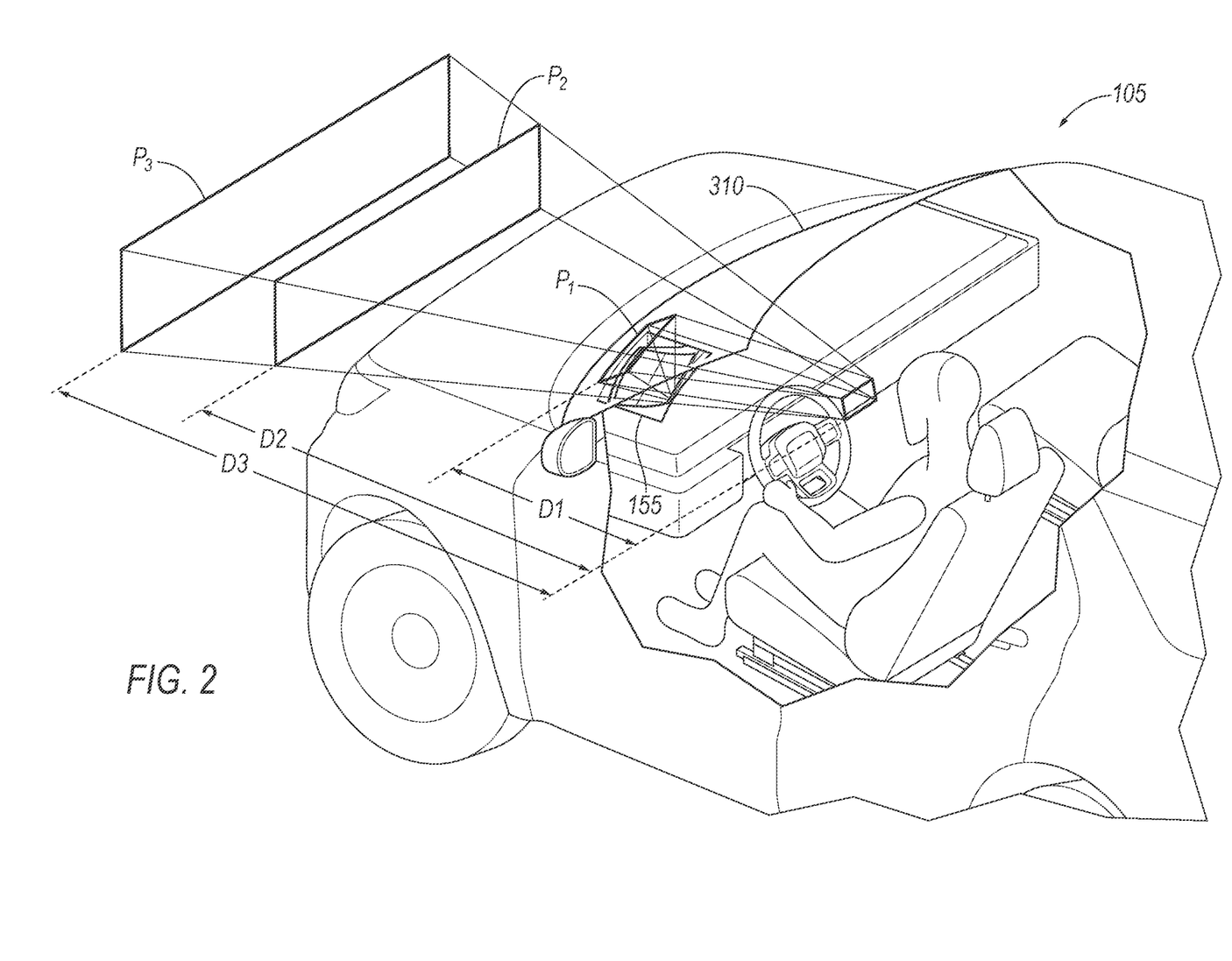
FIG. 2 is a perspective view of the vehicle illustrating a plurality of focal planes for providing an AR image.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with remote computers 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(s), etc., disposed on a top of the vehicle 105, behind a vehicle 105 front windshield 310, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g., front view, side view, etc., providing images from an area surrounding the vehicle 105. As another example, the vehicle 105 can include one or more sensors 115, e.g., camera sensors 115, mounted inside a cabin of the vehicle 105 and oriented to capture images of users in the vehicle 105 cabin. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115, e.g., substantially continuously, periodically, and/or when instructed by a remote computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. As another example, the data may be image data of the vehicle 105 cabin, e.g., including users and seats in the vehicle 105 cabin. Image data herein means digital image data, i.e., comprising pixels, typically with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect a user input and provide user input data to the vehicle computer 110. That is, the vehicle computer 110 may be programmed to receive user input from the HMI 118. The user may provide the user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

The vehicle 105 further includes the SLM 150. An "SLM" is an object that imposes spatially varying modulation on a beam of light. The SLM 150 is arranged to receive light from a projector 155 and to modulate the light according to a pixel-wise phase matrix to output the light onto the windshield 310 to provide and AR image 300 that can appear to be exterior to the vehicle 105. The SLM 150 is coupled to the vehicle communication network and can send and/or receive messages to/from the vehicle computer 110 and other vehicle sub-systems.

The vehicle 105 further includes a projector 155. The projector 155 can be arranged to display images in a field of view of an occupant of the vehicle 105. The projector 155 can be arranged to display images vehicle-forward of the occupant to provide information about vehicle surroundings, vehicle operations, etc. For example, the projector 155 can project light onto the windshield 310. Specifically, the projector 155 can project light through the SLM 150 to the windshield 310. The light is reflected by the windshield 310 to provide the AR image 300 in the light of sight of the occupant so as to be viewable by and understood by the occupant. Although the AR image 300 is projected onto the windshield 310, the AR image 300 appear to the occupant to be exterior to the vehicle 105 to provide an augmented reality display of surroundings of the vehicle 105. Specifically, the plurality of sub-images 305 of the AR image 300 appear to be in respective focal planes $P_1, P_2, P_3$ forward of the vehicle 105, as discussed below. The projector 155 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote computer 140 (typically via direct radio frequency communications).

The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, Ultra-Wideband (UWB), Near Field Communication (NFC), dedicated short range communications (DSRC), and/or wide area networks (WAN), including the Internet, providing data communication services.

The network 135 represents one or more mechanisms by which a vehicle computer 110 may communicate with remote computing devices, e.g., the remote computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services.

The remote computer 140 can be a conventional computing device, i.e., including one or more processors and one or more memories, programmed to provide operations such as disclosed herein. Further, the remote computer 140 can be accessed via the network 135, e.g., the Internet, a cellular network, and/or some other wide area network.

During operation, the vehicle computer 110 can receive vehicle operation data of one or more components 125 from one or more sensors 115. In this context, "vehicle operation data" are data describing operation of vehicle components, i.e., operation data are data measuring various component attributes as the vehicle operates on a road. The operation data can include, e.g., speed data, acceleration data, braking data, steering angle data, etc. That is, as vehicles operate, the vehicle operation data provide measurements describing how the vehicles operate.

Additionally, the vehicle computer 110 can receive environment data of the environment around the vehicle 105 from one or more sensors 115. In this context, "environment data" are data describing objects around the vehicle 105 as the vehicle 105 operates on the road. The vehicle computer 110 can identify the detected object 160 based on the environment data. For example, object identification techniques can be used, e.g., in the vehicle computer 110 based on LIDAR sensor 115 data, camera sensor 115 data, etc., to identify a type of object 160, e.g., a user, an animal, a vehicle, etc., as well as physical features of objects 205.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification of a user or an indication that no user is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

The vehicle computer 110 can determine a first distance between a detected object 160 and the vehicle 105 based on sensor 115 data. For example, a sensor 115, e.g., a radar sensor 115, mounted to the vehicle 105 can measure an amount of time elapsed from emitting a radio wave to receiving the radio wave reflected from the object 160. Based on the time elapsed and a speed of light, the vehicle computer 110 can determine the first distance between the object 160 and the vehicle 105.

Additionally, the vehicle computer 110 can determine navigation data for the vehicle 105. In this context, "navigation data" are data describing a planned path of the vehicle 105, i.e., navigation data are data measuring various features of the planned path as the vehicle 105 operates along the planned path. For example, the navigation data can include a second distance between the vehicle 105 and a location of a specified vehicle operation for maintaining operation of the vehicle along a planned path. As one example, the specified vehicle operation can be turning the vehicle 105 from a current road to, e.g., a new road, a parking lot, etc. As another example, the specified vehicle operation can be to change a lane of operation so as to permit the vehicle 105 to depart the current road, e.g., via a lane permitting turning and/or merging maneuvers. As yet another example, the specified vehicle operation can be to maintain the vehicle 105 on the current road, e.g., via a lane change operation.

The vehicle computer 110 can determine the second distance between the vehicle 105 and the location of the specified vehicle operation, e.g., by comparing respective geo-coordinates. For example, the vehicle computer 110 may receive a location of the vehicle 105, e.g., from a sensor 115, a navigation system, a remote computer 140, etc. The vehicle computer 110 can determine the geo-coordinates for the location of the specified vehicle operation based on the planned path. As one example, the planned path may specify the geo-coordinates for the location of the specified vehicle operation. As another example, the vehicle computer 110 may overlay the planned path onto map data, e.g., received from the remote computer 140. In such an example, the map data may specify geo-coordinates for various locations. The vehicle computer 110 can determine the geo-coordinates for the location of the specified vehicle operation based on selecting a location on the map corresponding to the specified vehicle operation of the planned path.

The vehicle computer 110 can generate the planned path, e.g., to avoid detected objects, to reach a destination specified by a user input, etc. As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \quad (1)$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

The vehicle computer 110 can generate a three-dimensional (3D) image based on the vehicle operation data, the environment data, including the first distance, and the navigation data, including the second distance. For example, the vehicle computer 110 can maintain a look-up table, or the like, that associates various graphics with corresponding vehicle operation data, the environment data, and the navigation data. Upon determining the vehicle operation data, the environment data, and the navigation data, the vehicle computer 110 can access the look-up table and determine corresponding graphics. For example, the vehicle computer 110 can select graphics associated with stored vehicle operation data, stored environment data, and stored navigation data that corresponds to, i.e., substantially matches, the determined vehicle operation data, the determined environment data, and the determined navigation data. The vehicle computer 110 can then input the graphics, the vehicle operation data, the environment data, and the navigation data into an image generator (e.g., a neural network, such as an encoder-decoder neural network, a generative adversarial network, etc.) that outputs the 3D image, e.g., according to known image generation techniques. The 3D image includes the selected graphics each displayed in one of a plurality of focal planes $P_1$, $P_2$, $P_3$. The image generator determines the focal plane $P_1$, $P_2$, $P_3$ for each graphic based on the vehicle operation data, the environment data, and the navigation data.

Figure 3:
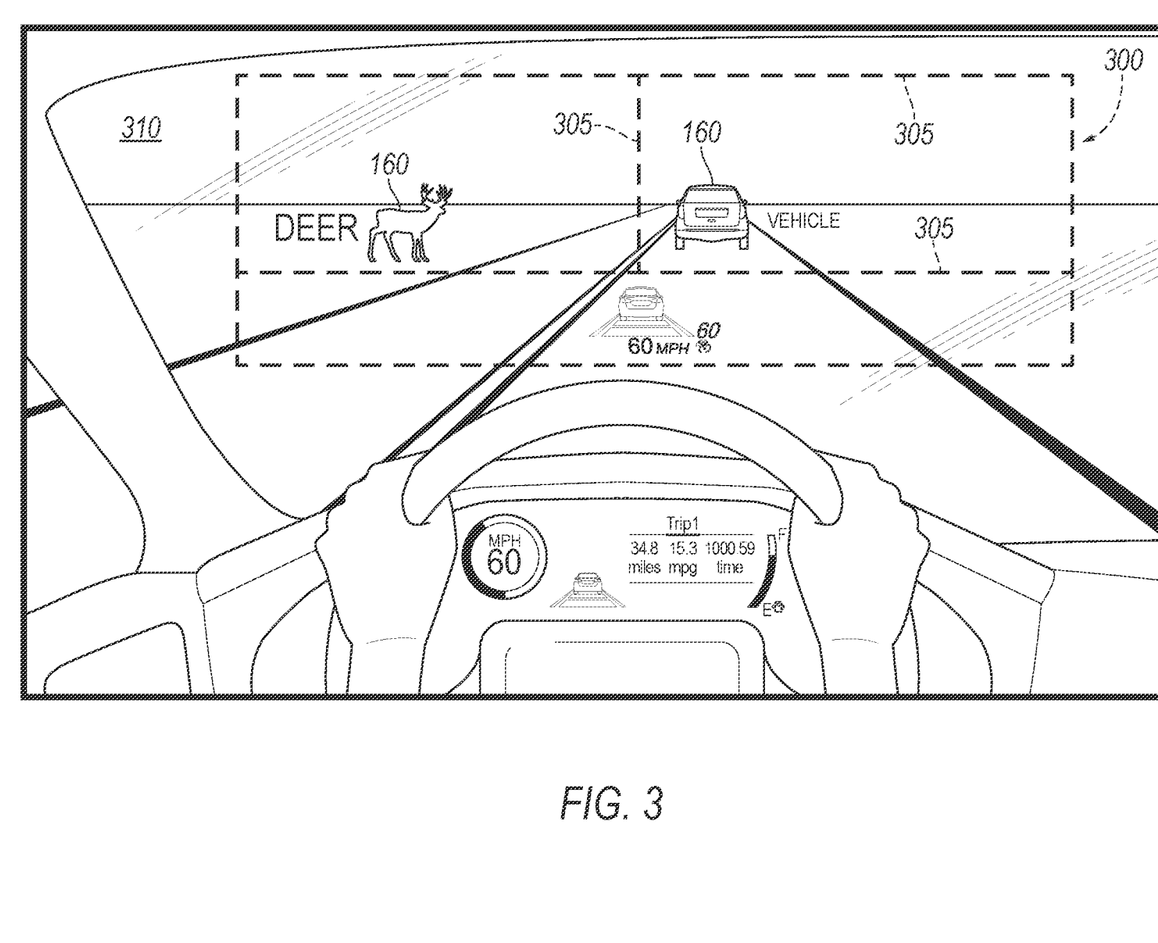
FIG. 3 is a view of an example roadway on which the vehicle is driving illustrating an example AR image.

Each focal plane $P_1$, $P_2$, $P_3$ is a plane positioned a specified distance $D_1$, $D_2$, $D_3$ forward of an expected pose of an occupant in which a sub-image 305 of the AR image 300 is projected (see FIG. 3). That is, the sub-image 305 will appear to the occupant to be in front of the vehicle 105 by the specified distance $D_1$, $D_2$, $D_3$ corresponding to the focal plane $P_1$, $P_2$, $P_3$. A sub-image 305 is a portion, i.e., less than all, of the AR image 300. The vehicle computer 110 can actuate the SLM 150 to output an AR image 300 including a plurality of non-overlapping sub-images 305, as discussed below. The distances can be determined or selected based on empirical testing or simulation, for example, to determine desired distances of the focal planes $P_1$, $P_2$, $P_3$ from the perspective of the occupant.

The vehicle computer 110 can determine to provide one or more of the plurality of focal planes $P_1$, $P_2$, $P_3$ as output to the HMI 118 based on a user input selecting the focal plane(s). An occupant may wish to enable or disable a focal plane based of various factors, e.g., relevance of or interest in its content at a current time or during a current or planned vehicle operation. For example, the vehicle computer 110 can actuate and/or instruct the HMI 118 to display virtual buttons corresponding to various focal planes $P_1$, $P_2$, $P_3$ that the user can select to specify the focal planes $P_1$, $P_2$, $P_3$. In other words, the HMI 118 may activate sensors that can detect the first user selecting virtual buttons to specify the focal planes $P_1$, $P_2$, $P_3$. Upon detecting the user input, the HMI 118 can provide the user input to the vehicle computer 110, and the vehicle computer 110 can determine the focal planes $P_1$, $P_2$, $P_3$ for output or display based on the user input. For example, the user input may specify three focal planes $P_1$, $P_2$, $P_3$ at three specified distances $D_1$, $D_2$, $D_3$. (see FIG. 2). In this example, a first focal plane $P_1$ may be positioned forward of the expected pose of the occupant by a first distance $D_1$. The first distance $D_1$ may be specified such that the sub-image 305 provided in the first focal plane $P_1$ appears to be on the windshield 310. Additionally, a second focal plane $P_2$ may be positioned forward of the expected pose of the occupant by a second distance $D_2$. The second distance $D_2$ may be specified such that the second distance $D_2$ is farther away from the expected pose of the occupant than the first distance $D_1$, i.e., the sub-image 305 provided in the second focal plane $P_2$ may appear to be exterior to the windshield 310. Additionally, a third focal plane $P_3$ may be positioned forward of the expected pose of the occupant by a third distance $D_3$. The third distance $D_3$ may be specified such that the third distance $D_3$ is farther away from the expected pose of the occupant than the second distance $D_2$, i.e., the sub-image 305 provided in the third focal plane $P_3$ may appear to be exterior to the windshield 310 and farther than the sub-image 305 provided in the second focal plane $P_2$.

The expected pose of an occupant (from which distances $D_1$, $D_2$, $D_3$ are measured) can, for example, be determined empirically, e.g., based on testing that allows for determining an average (or some other statistical measure) height and average (or some other statistical measure) vehicle seat position (e.g., specified according to the vehicle coordinate system) for various occupants. In this situation, the expected pose can be stored, e.g., in a memory of the vehicle computer 110.

As another example, the vehicle computer 110 can determine the expected pose based on receiving a second user input specifying the expected pose of the occupant. For example, the vehicle computer 110 can actuate and/or instruct the HMI 118 to display virtual buttons corresponding to various expected poses that the user can select to specify the expected pose, as just discussed above regarding the first user input. In such an example, the vehicle computer 110 can receive a plurality of estimated poses, e.g., from a remote computer 140. The plurality of expected poses may be determined empirically, e.g., based on physically measuring occupants having various heights in specified seat positions.

As yet another example, the vehicle computer 110 can selected an expected pose that is closest to an actual pose of the occupant. In such an example, the vehicle computer 110 can receive the plurality of estimated poses, e.g., from a remote computer 140. The vehicle computer 110 can then determine the actual pose of the occupant and compare the actual pose to each of the expected poses. Upon determining differences between each expected pose and the actual pose, the vehicle computer 110 can select the expected pose corresponding to a minimum difference.

The vehicle computer 110 can determine the actual pose for the occupant based on sensor 115 data. For example, the vehicle computer 110 can obtain an image from an image sensor 115 positioned to face the occupant when the occupant is seated inside the vehicle 105. The vehicle computer 110 can then input the image to a machine learning program that identifies keypoints. The machine learning program can be a conventional neural network trained for processing images, e.g., OpenPose, Google Research and Machine Intelligence (G-RMI), DL-61, etc. For example, OpenPose receives, as input, an image and identifies keypoints in the image corresponding to human body parts, e.g., hands, feet, joints, etc. OpenPose inputs the image to a plurality of convolutional layers that, based on training with a reference dataset such as Alpha-Pose, identify keypoints in the image and output the keypoints. The keypoints include depth data that the image alone does not include, and the vehicle computer 110 can use a machine learning program such as OpenPose to determine the depth data to identify the actual pose of the occupant in the image. That is, the machine learning program outputs the keypoints as a set of three values: a length along a first axis of a 2D coordinate system in the image, a width along a second axis of the 2D coordinate system in the image, and a depth from the image sensor 115 to the vehicle occupant, the depth typically being a distance along a third axis normal to a plane defined by the first and second axes of the image. The vehicle computer 110 can then connect the keypoints, e.g., using data processing techniques, to determine the actual pose of the occupant.

Upon generating the 3D image, the vehicle computer 110 can generate a set of two-dimensional (2D) depth masked images based on the 3D image. To generate a 2D depth masked image, the vehicle computer 110 can mask pixels of the 3D image based on one of the focal planes $P_1$, $P_2$, $P_3$. In this context, to "depth mask" pixels, the vehicle computer 110 performs a pixel wise filtering operation to hide pixels based on depths of the pixels. For example, the 3D image may include a set of 3D coordinates for each pixel in the 3D image, e.g., with respect to a vehicle coordinate system. The vehicle computer 110 can identify pixels in the 3D image that have a depth outside of a predetermined range associated with the one focal plane $P_1$, $P_2$, $P_3$ and can mask the identified pixels. That is, the vehicle computer 110 can generate a 2D depth masked image with values of 0 for pixels identified to be masked for the one focal plane $P_1$, $P_2$, $P_3$. The vehicle computer 110 can continue to generate 2D depth masked images in this manner until one 2D depth masked image is generated for each focal plane $P_1$, $P_2$, $P_3$. The predetermined range may be determined based on a distance between the one focal plane $P_1$, $P_2$, $P_3$ and the occupant (or nearest intermediate focal plane $P_1$, $P_2$, $P_3$ between the occupant and the one focal plane $P_1$, $P_2$, $P_3$).

The vehicle computer 110 can determine a pixel-wise phase matrix for the 3D image by inputting the set of 2D depth masked images into a neural network, such as a deep neural network (DNN) 400 (see FIG. 4). The DNN 400 can be trained (as discussed below) to accept the set of 2D depth masked images as input and generate an output of a calibrated pixel-wise phase matrix for the 3D image. A calibrated pixel-wise phase matrix is a matrix identifying pixels in the 3D image and specifying a pixel phase for each pixel. A "pixel phase" is an adjustment to a point in time that a sample is taken in an analog-digital conversion. A pixel phase allows for synchronizing pixel (or dot) clocks of the vehicle computer 110 and a projector. A "pixel clock" is a speed at which pixels are transmitted such that a full frame of pixels fits within one refresh cycle. Unsynchronized pixel clocks can result in pixel banding, i.e., multiple pixels end at the same pixel coordinates, which reduces the resolution of the AR image 300. The pixel-wise phase matrix for the 3D image is calibrated based on the physical properties of the windshield 310, the SLM, and the projector. That is, the calibrated pixel-wise phase matrix allows the vehicle computer 110 to account for distortion, lack of focus, or low quality of the AR image 300 resulting from the physical properties of the windshield 310, the SLM 150, and/or the projector 155, as discussed below.

Upon determining the calibrated pixel-wise phase matrix, the vehicle computer 110 actuates the projector 155 to provide the 3D image to the SLM 150. Providing the 3D image to the SLM 150 allows the vehicle computer 110 to output an AR image 300 onto the windshield 310. (see FIG. 3). The AR image 300 as shown in FIG. 3 provides an example view as would be seen by the occupant of the vehicle 105, e.g., a driver. The AR image 300 may indicate to the occupant the presence of objects in view of the AR image 300. In the example shown in FIG. 3, the AR image 300 indicates an animal on the left side of the roadway and a second vehicle ahead of the vehicle 105. The objects may be indicated by lights, colors, or verbiage within the AR image 300. Additionally, the AR image 300 may indicate vehicle measurements and information about the operation of the vehicle 105, e.g., speedometer, odometer, tachometer, fuel status, turn-by-turn navigation instructions, etc.

Specifically, the vehicle computer 110 actuates the SLM 150 based on the calibrated pixel-wise phase matrix to output the AR image 300 including sub-images 305 into respective focal planes $P_1$, $P_2$, $P_3$. That is, the SLM 150 receives the 3D image as input and spatially modulates the 3D image according to the calibrated pixel-wise phase matrix to output the AR image 300. The AR image 300, and specifically, the sub-images 305 at the respective focal planes $P_1$, $P_2$, $P_3$, is provided in the line of sight of the occupant so as to be viewable by and understood by the occupant. Each sub-image 305 may include, for example, information about vehicle operation and/or objects in the environment around the vehicle 105. As discussed above, providing the sub-images 305 of the AR image 300 in respective focal planes $P_1$, $P_2$, $P_3$ can improve the quality of the AR image 300.

The windshield 310 may include a photopolymer film arranged to receive the AR image 300 on the windshield 310. The light from the projection 155 may be reflected by photopolymer film making the AR image 300 visible to occupant. The photopolymer film may be any suitable material such that the light from the projector 115 may be reflected by the photopolymer film. For example, the photopolymer film may be RGB light sensitive for recording volume holograms. The photopolymer film may, for example, be between layers of polyvinyl butyral ("PVB") and glass of the windshield 310.

FIG. 4 is a diagram of a deep neural network (DNN) 400. The DNN 400 can be a software program executing on the remote computer 140. Once trained, the DNN 400 can be downloaded to the vehicle computer 110. The vehicle computer 110 can use the DNN 400 to generate an AR image 300 having a plurality of sub-images 305 output in respective focal planes $P_1$, $P_2$, $P_3$. Advantageously, the trained DNN 400 allows for a computer 110 or the like to output higher quality images at desired depths, e.g., at respective focal planes $P_1$, $P_2$, $P_3$. Feedback images captured by a sensor focusing at different focal planes during training are typically of lower than desired quality, e.g., blurry, out-of-focus, noisy, containing artifacts, etc., caused by the nonlinearity of SLM 150, varying windshield geometry, and/or optical aberrations of the windshield and other optical elements in the system. The DNN 400 can be trained to increase the quality of such images.

The DNN 400 can include a plurality of convolutional layers (CONV) 404 that process input images (IN) 402 by convolving the input images 402 using convolution kernels to determine latent variables (LV) 406. The DNN 400 includes a plurality of fully-connected layers (FC) 408 that process the latent variables 406 to produce a pixel-wise phase matrix (PM) 410. The DNN 400 can input a set of 2D depth masked images 402, as discussed above, to determine a pixel-wise phase matrix 410. The pixel-wise phase matrix 410 is a matrix identifying pixels in the training images 402 and specifying a pixel phase for each pixel.

The DNN 400 is trained by processing a dataset that includes a plurality of training images 402. Prior to training the DNN 400, the focal planes $P_1$, $P_2$, $P_3$ are defined as described above, e.g., based on desired distances $D_1$, $D_2$, $D_3$ from the perspective of an occupant. (Note that the examples herein discuss three focal planes, but in other examples there could be other numbers of focal planes.) Each of the training images 402 may be depth masked based on one of the focal planes $P_1$, $P_2$, $P_3$. The training images 402 may be stored, e.g., in a memory of the remote computer 140. To train the DNN 400, the remote computer 140 selects a set of training images 402 from the plurality of training images 402. The remote computer 140 can select one training image 402 for each respective focal plane $P_1$, $P_2$, $P_3$. That is, each training image 402 in the selected set may be depth masked based on one respective focal plane $P_1$, $P_2$, $P_3$. The remote computer 140 inputs the set training images 402 into the DNN 400 that outputs a pixel-wise phase matrix 410 for the selected set of training images 402.

Upon determining the pixel-wise phase matrix 410 for the selected set of training images 402, the remote computer 140 actuates the projector 155 to provide the selected set of training images 402 to the SLM 150, as discussed above. For example, the remote computer 140 can provide, e.g., via the network 135, instructions to the projector 155 to provide the selected set of training images 402. The remote computer 140 then actuates the SLM 150 based on the pixel-wise phase matrix 410 to output an AR image 300 of the selected set of training images 402. For example, the remote computer 140 can provide, e.g., via the network 135, instructions to the SLM 150 to actuate based on the pixel-wise phase matrix 410. That is, the SLM 150 outputs the selected set of training images 402 into respective focal planes $P_1$, $P_2$, $P_3$. The selected set of training images 402 is reflected by the windshield 310 to provide the AR image 300 of the selected set of training images 402, as discussed above.

Figure 5A:
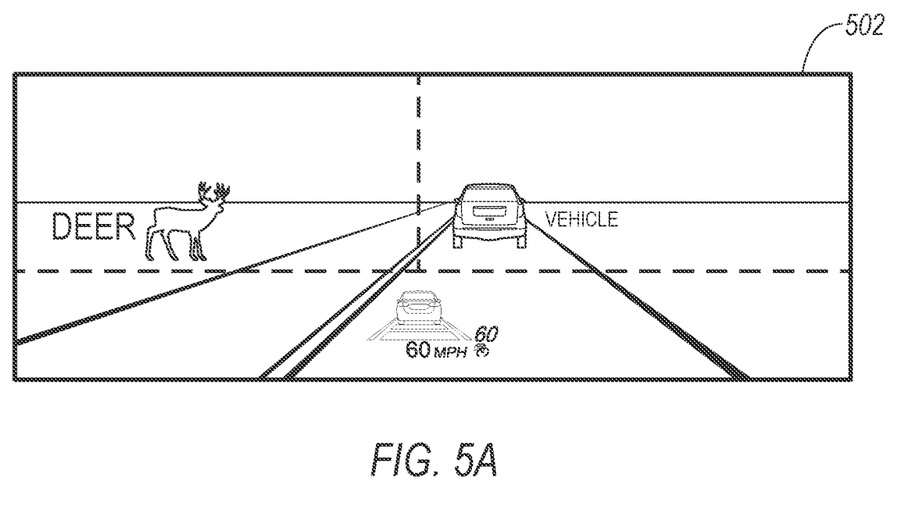
FIG. 5A is an example training image.
Figure 5B:
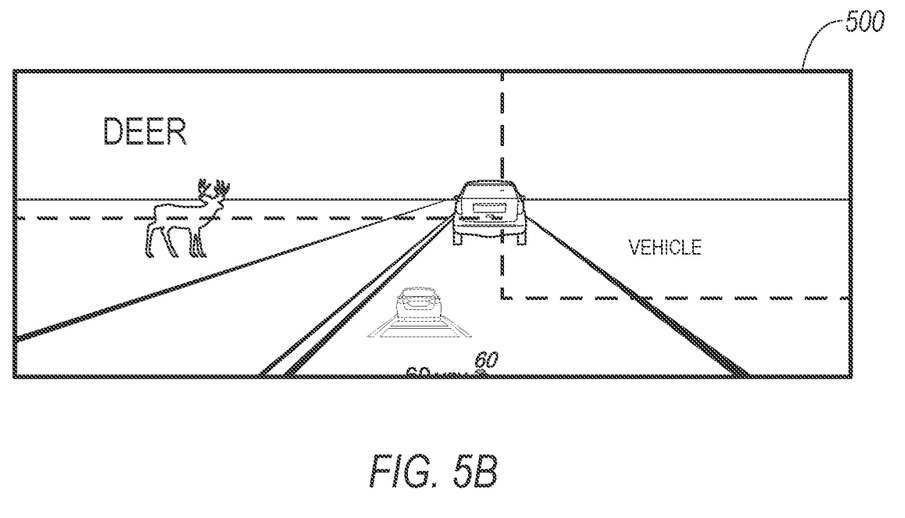
FIG. 5B is an example feedback image.

Upon detecting the AR image 300 of the selected set of training images 402 on the windshield 310, the remote computer 140 can determine an offset between the selected set of training images 402 and a feedback image 500 at corresponding focal planes. An offset specifies an intensity difference between features and/or pixels in the selected set of training images 402 and the feedback image 500. An example of an offset can be seen by comparing FIGS. 5A and 5B. FIG. 5A shows an expected feedback image 502, and FIG. 5B shows an actual feedback image 500. As seen in FIG. 5B, the actual feedback image 500 locates objects at different locations, i.e., locations of pixels are offset, than in the expected feedback image 500.

The offset may result from various factors. As one example, the windshield 310 may cause the offset. For example, due to manufacturing tolerances and/or being repaired, windshields in various vehicles may have different physical properties (e.g., a contour, transparency, composition, alignment relative to a windshield opening of the vehicle and/or an instrument panel, etc.). As another example, features of various projectors and SLMs may be different relative to each other based on manufacturing tolerances and/or being repaired. Determining the offset between the selected set of training images 402 and the feedback image 500 allows the DNN 400 to be trained to determine a pixel-wise phase matrix that minimizes the offset for the various factors in the vehicle 105 that contribute to the offset, i.e., is calibrated to the vehicle 105.

To determine the offset, the remote computer 140 can generate an expected feedback image 502 (see FIG. 5A) based on the selected set of training images 402. For example, the remote computer 140 can overlay the selected set of training images 402 based on the masked pixels of the respective images 402. That is, the remote computer 140 can align the selected set of training images 402 such that the masked pixels of some of the training images 402 are hidden by corresponding unmasked pixels of other training images 402. The remote computer 140 can then compare the expected feedback image 502 to the feedback image 500, e.g., using known image differencing techniques. For example, the remote computer 140 can determine differences between corresponding pixel values between the expected feedback image 502 and the feedback image 500 and can generate an image based on the determined differences in pixel values.

As another example, the remote computer 140 can determine distances (in pixel coordinates) between corresponding features in the expected feedback image 502 and the feedback image 500, e.g., using known image processing techniques. As one example, the remote computer 140 can determine the offset based on an average distance between corresponding features, e.g., by using a mean square error (MSE). In this situation, the offset is determined from the average distance. As another example, the remote computer 140 can use an intersection over union (IoU) to determine a ratio of an area of intersection between corresponding features in the expected feedback image 502 and the feedback image 500. In this situation, the offset is determined from the ration.

The remote computer 140 can detect the AR image 300 via a feedback image 500, e.g., using known image recognition techniques, as discussed above. A feedback image 500 is obtained from the image sensor 145. The image sensor 145 can be separate from the vehicle 105. For example, the image sensor 145 can be mounted in the vehicle 105 while training the DNN 400 and removed after training is complete. That is, the image sensor 145 can be remote from the vehicle 105 during operation of the vehicle 105 by an occupant.

Figure 6:
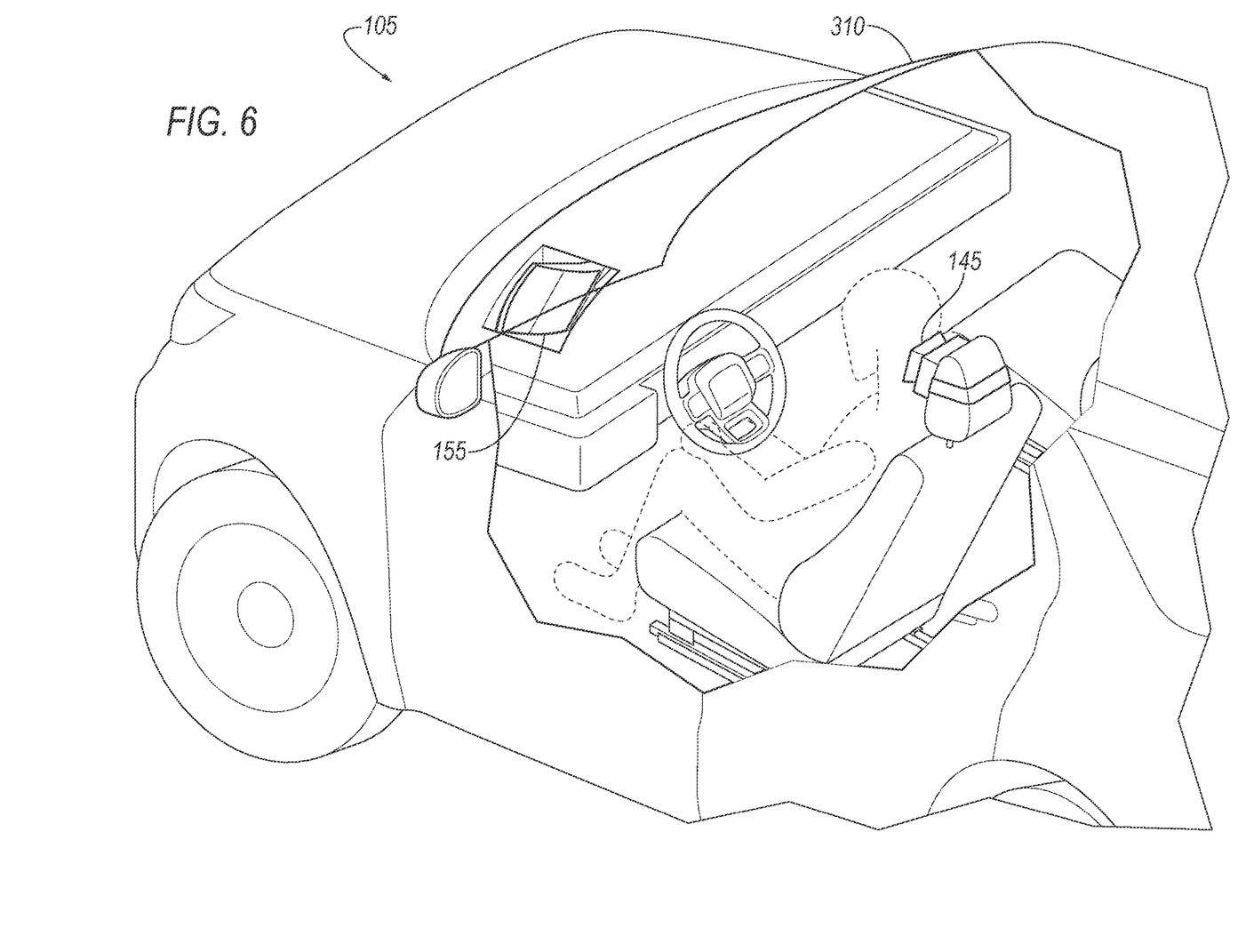
FIG. 6 is a perspective view of the vehicle including an example image sensor positioned to face a windshield of the vehicle.

The image sensor 145 can be deployed in a fixed or stationary manner, e.g., mounted to a fixture, mounted to a vehicle seat, etc. The image sensor 145 may be positioned in the vehicle 105 based on an estimated pose of an occupant (as discussed above). For example, as shown in FIG. 6, the image sensor 145 may be positioned adjacent to a headrest of a vehicle seat. That is, the image sensor 145 may be positioned to have a field of view that substantially corresponds to a field of view of an occupant in the vehicle seat. Specifically, the field of view of the image sensor 145 includes the windshield 310. That is, the image sensor 145 is positioned to view the windshield 310 from substantially the same perspective as an occupant in the vehicle seat.

The remote computer 140 can update parameters of a loss function based on the offset. Back-propagation can compute a loss function based on the expected feedback image 502 and the feedback image 500. A loss function is a mathematical function that maps values such as the expected feedback image 502 and the feedback image 500 into real numbers that can be compared to determine a cost during training. In this example, the cost is the offset. The loss function determines how closely the expected feedback image 502 matches the feedback image 500 and is used to adjust the parameters or weights that control the DNN.

Parameters or weights include coefficients used by linear and/or non-linear equations included in fully-connected layers. Fully-connected layers process the latent variables output by other hidden layers. Upon determining the offset, the remote computer 140 can update the parameters of the loss function. For example, the remote computer 140 can systematically vary these parameters or weights and compare the output results to a desired result minimizing the loss function. As a result of varying the parameters or weights over a plurality of trials over a plurality of input images, a set of parameters or weights that achieve a result that minimizes the loss function can be determined. As another example, the remote computer 140 can optimize parameters of the loss function by applying gradient descent to the loss function. Gradient descent calculates a gradient of the loss function with respect to the current parameters. The gradient indicates a direction and magnitude to move along the loss function to determine a new set of parameters. That is, the remote computer 140 can determine a new set of parameters based on the gradient and the loss function. Applying gradient descent reduces an amount of time for training by using the loss function to identify specific adjustments to the parameters as opposed to selecting new parameters at random.

The remote computer 140 can then provide the updated parameters to the DNN 400. The remote computer 140 can then determine an updated offset based on the selected set of training images 402 and the updated DNN 400. For example, the remote computer 140 can input the selected set of training images 402 to the updated DNN 400 that can output an updated pixel-wise phase matrix 410 for the selected set of training images 402. The remote computer 140 can then actuate the SLM 150 based on the updated pixel-wise phase matrix 410 to output an updated AR image 300, as discussed above. The remote computer 140 can then obtain an updated feedback image 500 from the image sensor 145, as discussed above. The remote computer 140 can then determine an updated offset based on the expected feedback image 502 and the updated feedback image 500, e.g., in substantially the same manner as discussed above with respect to determining the offset.

The remote computer 140 can subsequently determine updated parameters, e.g., in substantially the same manner as discussed above with respect to updating the parameters of the loss function, until the updated offset is less than a predetermined threshold. That is, parameters controlling the DNN 400 processing are varied until output AR images 300 match, within the predetermined threshold, the input selected set of training images 402 for each of the plurality of training images 402 in the dataset. The predetermined threshold may be determined based on, e.g., empirical testing to determine a maximum offset at which a vehicle computer 110 can actuate the SLM 150 to output an AR image 300 achieving desired quality. Upon determining the offset, the remote computer 140 can compare the offset to the predetermined threshold. The predetermined threshold may be stored, e.g., in a memory of the remote computer 140. When the updated offset is less than the predetermined threshold, the DNN 400 is trained to accept a set of 2D depth masked images 402 generated from a 3D image as input and to generate a calibrated pixel-wise phase matrix for the 3D image.

Figure 7:
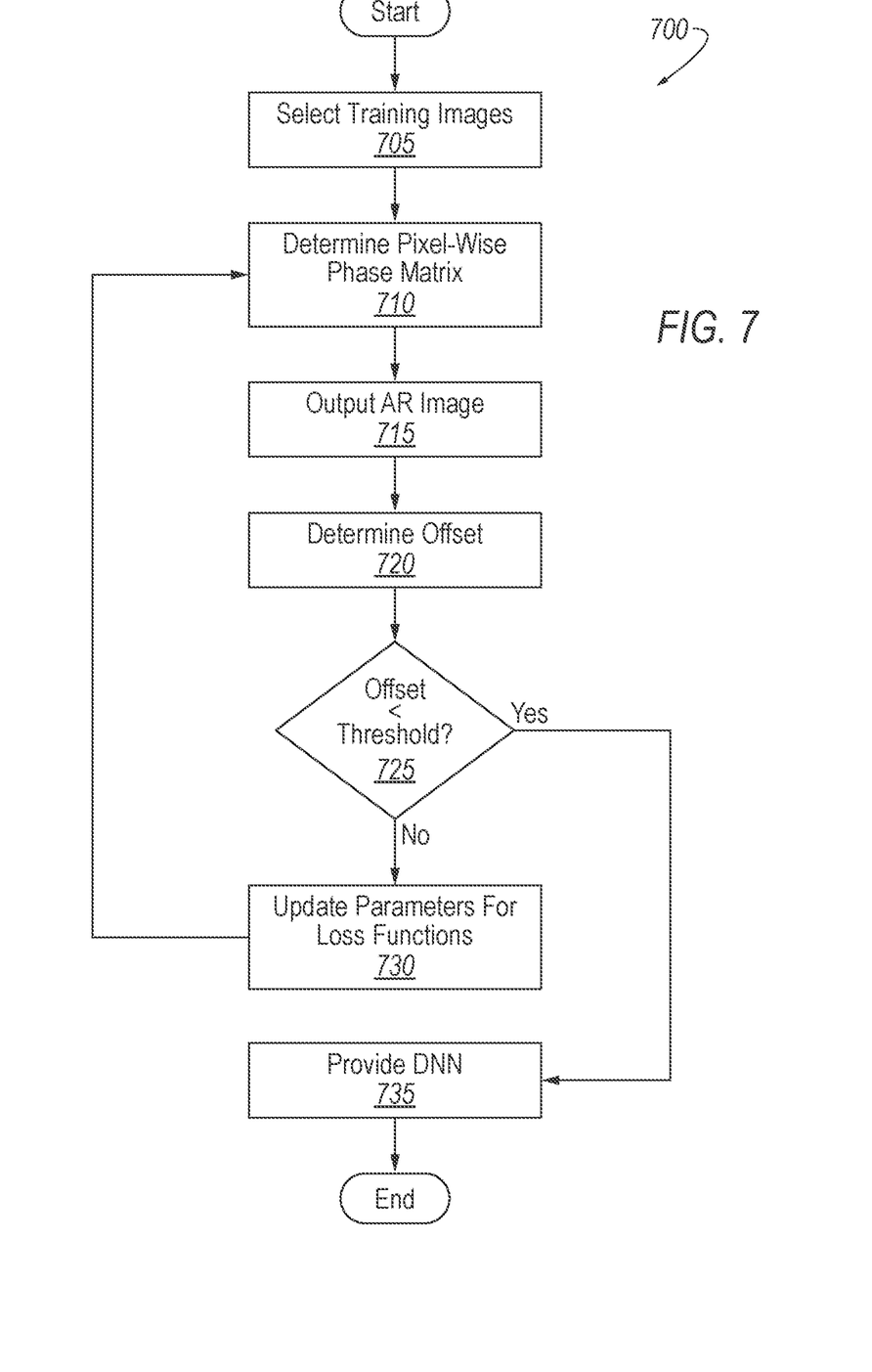
FIG. 7 is an example flowchart for training the neural network.

FIG. 7 is a diagram of an example process 700 executed in a remote computer 140 according to program instructions stored in a memory thereof for training a neural network 400 to accept input images 402 and to generate a pixel-wise phase matrix 410 for the input images 402. Process 700 includes multiple blocks that can be executed in the illustrated order. Process 700 could alternatively or additionally include fewer blocks or can include the blocks executed in different orders.

Process 700 begins in a block 705. In the block 705, the remote computer 140 selects a set of training images 402 from a plurality of training images 402, as discussed above. Each training image 402 in the selected set corresponds to one of a plurality of focal planes $P_1$, $P_2$, $P_3$, as discussed above. The process 700 continues in a block 710.

In the block 710, the remote computer 140 determines a pixel-wise phase matrix 410 for the selected set of training images 402. For example, the remote computer 140 can input the selected set of training images 402 into a DNN 400 that outputs the pixel-wise phase matrix 410, as discussed above. The process 700 continues in a block 715.

In the block 715, the remote computer 140 actuates an SLM 150 in a vehicle 105 to output an AR image 300 onto a vehicle windshield 310, as discussed above. Specifically, the remote computer 140 actuates the SLM 150 based on the pixel-wise phase matrix 410 determined in the block 610. Actuating the SLM 150 based on the pixel-wise phase matrix 410 allows the SLM 150 to output a plurality of sub-images 305 of the AR image 300 into respective focal planes $P_1$, $P_2$, $P_3$, as discussed above. The process 700 continues in a block 720.

In the block 720, the remote computer 140 determines an offset between an expected feedback image 502 and a feedback image 500. The remote computer 140 receives the feedback image 500 from an image sensor 145, as discussed above. The remote computer 140 determines the expected feedback image 502 based on the selected set of training images 402, as discussed above. The remote computer 140 can determine the offset according to image differencing techniques, as discussed above. The process 700 continues in a block 725.

In the block 725, the remote computer 140 determines whether the offset is less than a predetermined threshold. The remote computer 140 can compare the offset to the predetermined threshold. If the offset is less than the predetermined threshold, then the process 700 continues in a block 735. Otherwise, the process 700 continues in a block 730.

In the block 730, the remote computer 140 updates parameters of a loss function based on the offset, as discussed above. The remote computer 140 can then provide the updated parameters to the DNN 400. The process 700 returns to the block 710.

In the block 735, the remote computer 140 determines that the DNN 400 is trained to output a calibrated pixel-wise phase matrix. The remote computer 140 can then provide the DNN 400, e.g., data describing the DNN 400, to a vehicle computer 110, e.g., via the network 135. The process 700 ends following the block 735.

Figure 8:
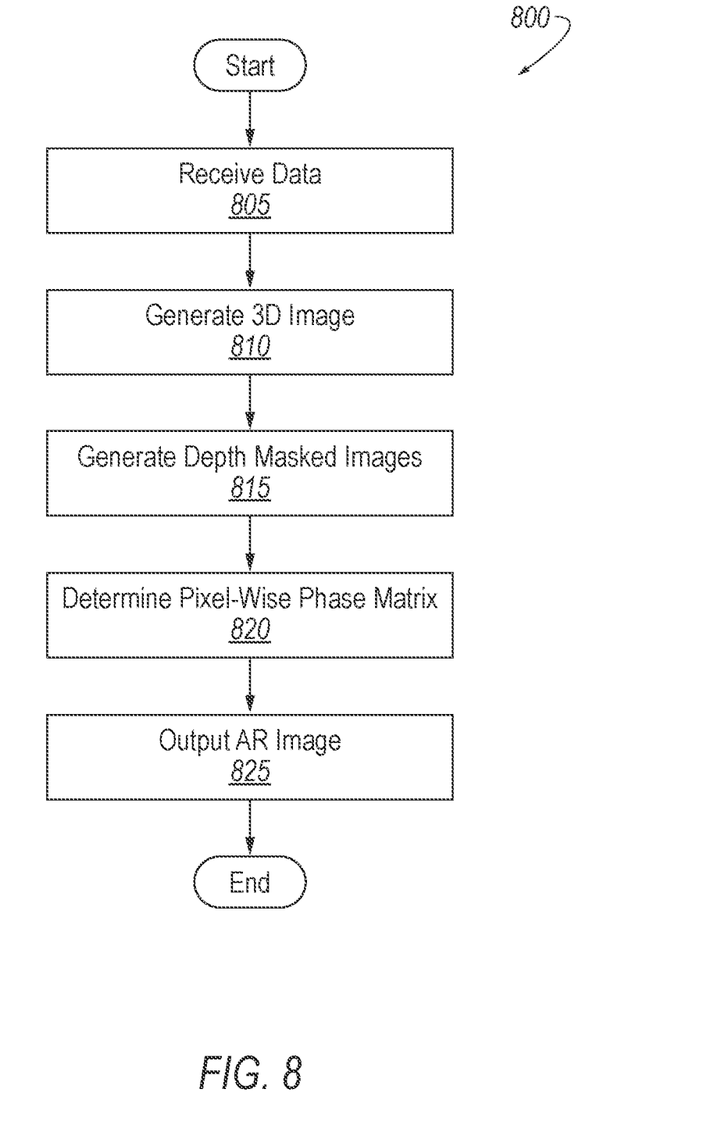
FIG. 8 is an example flowchart for outputting an AR image onto the windshield.

FIG. 8 is a diagram of an example process 800 executed in a vehicle computer 110 according to program instructions stored in a memory thereof for outputting an AR image 300 onto a vehicle windshield 310. Process 800 includes multiple blocks that can be executed in the illustrated order.

Process 800 could alternatively or additionally include fewer blocks or can include the blocks executed in different orders.

Process 800 begins in a block 805. In the block 805, the vehicle computer 110 receives data from one or more sensors 115, e.g., via a vehicle network, and/or from the remote computer 140, e.g., via the network 135. For example, the vehicle computer 110 can receive vehicle operation data, environment data, and navigation data, as discussed above. Additionally, the vehicle computer 110 can determine a first distance between the vehicle 105 and an object 160 and a second distance between the vehicle 105 and a location of a specified vehicle operation based on the received data, as discussed above. The process 800 continues in a block 810.

In the block 810, the vehicle computer 110 generates a 3D image based on the received data, the first distance, and the second distance, e.g., using an image generator, as discussed above. The process 800 continues in a block 815.

In the block 815, the vehicle computer 110 generates a set of 2D depth masked images from the 3D image, as discussed above. Each 2D depth masked image in the set is depth masked based on one respective focal plane $P_1$, $P_2$, $P_3$, as discussed above. The process 800 continues in a block 820.

In the block 820, the vehicle computer 110 determines a calibrated pixel-wise phase matrix for the 3D image using the trained DNN 400. For example, the vehicle computer 110 can input the set of 2D depth masked images into the trained DNN 400. The DNN 400 can the output the calibrated pixel-wise phase matrix for the 3D image. The process 800 continues in a block 825.

In the block 825, the vehicle computer 110 actuates the SLM 150 to output an AR image 300 onto the vehicle windshield 310. Specifically, the vehicle computer 110 actuates the SLM 150 based on the calibrated pixel-wise phase matrix. Actuating the SLM 150 based on the calibrated pixel-wise phase matrix allows the SLM 150 to output a plurality of sub-images 305 of the AR image 300 into respective focal planes $P_1$, $P_2$, $P_3$, as discussed above. The process 800 ends following the block 825.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a spatial light modulator (SLM) arranged to output, onto a vehicle windshield, an augmented reality (AR) image including a plurality of sub-images each output in one of a plurality of focal planes;
an image sensor positioned to obtain a feedback image of the AR image; and
a computer including a processor and a memory, the memory storing instructions executable by the processor programmed to:
input a set of training images into a neural network that outputs a pixel-wise phase matrix identifying pixels in the training images, wherein each training image corresponds to one respective sub-image;
actuate the SLM to output the AR image based on the pixel-wise phase matrix;
determine an offset based on comparing the training images to the feedback image; and
update parameters of a loss function based on the offset and provide the updated parameters to the neural network to obtain an updated offset.

2. The system of claim 1, wherein the instructions further include instructions to update parameters of the loss function until the updated offset is less than a predetermined threshold.

3. The system of claim 2, wherein the neural network is trained to output the pixel-wise phase matrix calibrated to the vehicle windshield and the SLM when the updated offset is less than the predetermined threshold.

4. The system of claim 1, wherein the image sensor is spaced from the vehicle windshield to correspond to an expected pose of an occupant.

5. The system of claim 1, wherein the instructions further include instructions to select the focal planes for the sub-images based on a user input.

6. The system of claim 1, wherein each focal plane is defined by a respective distance from an expected pose of an occupant.

7. The system of claim 1, wherein the instructions further include instructions to, while training the neural network, actuate a projector to provide the training images to the SLM.

8. The system of claim 1, wherein the instructions further including instructions to, while training the neural network, select the training images from a plurality of training images.

9. The system of claim 1, wherein the instructions further include instructions to:
after training the neural network, generate a three-dimensional (3D) image based on vehicle operation data; and
determine, via the trained neural network, a calibrated pixel-wise phase matrix for the 3D image.

10. The system of claim 9, wherein the instructions further include instructions to, upon generating a set of masked images from the 3D image, input the masked images to the trained neural network that outputs the calibrated pixel-wise phase matrix for the 3D image.

11. The system of claim 10, wherein the instructions further include instructions to generate the masked images by masking a plurality of pixels in the 3D image based on the focal planes, each masked pixel being a pixel of the 3D image having a depth corresponding to one of the focal planes.

12. The system of claim 9, wherein the instructions further include instructions to actuate the SLM to output the AR image based on the calibrated pixel-wise phase matrix.

13. The system of claim 12, wherein the instructions further include instructions to actuate a projector to provide the 3D image to the SLM.

14. A method, comprising:
inputting a set of training images into a neural network that outputs a pixel-wise phase matrix identifying pixels in the training images;
based on the pixel-wise phase matrix, actuating a spatial light modulator (SLM) to output, onto a vehicle windshield, an augmented reality (AR) image including a plurality of sub-images each output in one of a plurality of focal planes, wherein each training image corresponds to one respective sub-image;
obtaining a feedback image of the AR image via an image sensor;
determining an offset based on comparing the training images to the feedback image; and
updating parameters of a loss function based on the offset and providing the updated parameters to the neural network to obtain an updated offset.

15. The method of claim 14, further comprising updating parameters of the loss function until the updated offset is less than a predetermined threshold.

16. The method of claim 15, wherein the neural network is trained to output the pixel-wise phase matrix calibrated to the vehicle windshield and the SLM when the updated offset is less than the predetermined threshold.

17. The method of claim 14, wherein the image sensor is spaced from the vehicle windshield to correspond to an expected pose of an occupant.

18. The method of claim 14, further comprising selecting the focal planes for the sub-images based on a user input.

19. The method of claim 14, wherein each focal plane is selected based on a respective distance from an expected pose of an occupant.

20. The method of claim 14, further comprising, while training the neural network, actuating a projector to provide the training image to the SLM.

\* \* \* \* \*